United States Patent
Kuleszynski et al.

(10) Patent No.: US 7,184,891 B1
(45) Date of Patent: Feb. 27, 2007

(54) SYSTEM AND METHOD FOR FORECASTING POLLEN IN ACCORDANCE WITH WEATHER CONDITIONS

(75) Inventors: Christopher R. Kuleszynski, Woodstock, GA (US); Cameron C. Brown, Acworth, GA (US); Timothy W. Bernas, Atlanta, GA (US); Kristin E. Boyko, Woodstock, GA (US); Bruce L. Rose, Jr., Smyrna, GA (US)

(73) Assignee: The Weather Channel, Inc., Atlanta, GA (US)

( * ) Notice: Subject to any disclaimer, the term of this patent is extended or adjusted under 35 U.S.C. 154(b) by 171 days.

(21) Appl. No.: 10/868,106

(22) Filed: Jun. 15, 2004

(51) Int. Cl.
*G01W 1/00* (2006.01)
(52) U.S. Cl. ........................................................ 702/3
(58) Field of Classification Search .................... 702/2, 702/3, 5; 703/2, 11
See application file for complete search history.

(56) References Cited

U.S. PATENT DOCUMENTS

| | | | |
|---|---|---|---|
| 6,031,455 A | * | 2/2000 | Grube et al. ........... 340/539.26 |
| 6,662,195 B1 | * | 12/2003 | Langseth et al. ........... 707/200 |
| 2001/0029535 A1 | * | 10/2001 | Hirano et al. ............... 709/224 |
| 2003/0076369 A1 | * | 4/2003 | Resner et al. ............... 345/864 |
| 2003/0208113 A1 | * | 11/2003 | Mault et. al. ............... 600/316 |

OTHER PUBLICATIONS

Tomas R. Cotos-Yanez et al., "Short-term prediction of Betula airborne pollen concentration in Vigo (NW Spain) using logistic additive models and partially linear models", International Journal of Biometeorology, Publisher: Springer Berlin/Heidelberg, ISSN 1432-1254, published online Feb. 10, 2004, pp. 179-185.*

* cited by examiner

*Primary Examiner*—Donald McElheny, Jr.
(74) *Attorney, Agent, or Firm*—Woodcock Washburn LLP

(57) ABSTRACT

A method and system for providing an improved pollen forecast for tree, grass, and ragweed pollen levels. The system provides a searchable, two-day forecast for zip codes and cities within the continental United States. The forecast is based on observed and forecast weather conditions and observed pollen conditions. A growing degree day value is determined that is used to represent trends in pollen activity. From this information, a pollen forecast is presented on a "Low-Moderate-High-Very High" scale in order to quickly convey to the user the forecasted pollen count.

24 Claims, 6 Drawing Sheets

SYSTEM AND METHOD FOR FORECASTING POLLEN IN ACCORDANCE WITH WEATHER CONDITIONS

FIELD OF THE INVENTION

The present invention relates to forecasting environmental conditions. In particular, the present invention is directed to a system and method for forecasting pollen conditions based on current observations and weather conditions.

BACKGROUND OF THE INVENTION

For millions who have seasonal allergies, rising pollen counts in the spring bring symptoms that can ruin a time of year that the rest enjoy. Allergy symptoms are not only annoying, but for many people interfere with their ability to work, perform at school, or even sleep. Understanding the significance of pollen and mold spore counts can help better manage symptoms for several types of allergies.

Pollens and molds represent the most significant outdoor allergens. Researchers are interested in pollen and mold sampling because these airborne allergens occur in easily identifiable units. Attempts at counting pollens go back over 100 years. Initial investigators collected particles on an adhesive coated slide. However, variables such as wind speed and particle size changed the number of particles coming to rest on a slide, affecting the accuracy of this method. More recently, researchers have developed volumetric techniques that measure the concentration of pollen grains or mold spores in the air. This gives them a better estimate of how much pollen people in the sampling area are being exposed to.

Two of the more popular volumetric samplers used in this country over the past few years are the Rotorod sampler and the Volumetric Spore Trap. The Rotorod sampler uses small adhesive coated rods that intermittently spin through a certain volume of air so that the particles in that air stick to the rod. At the end of 24 hours, the particles are identified under a microscope and the concentration of particles per cubic meter of air is calculated.

The Rotorod sampler does a good job collecting pollens and larger molds. However, smaller mold spores are not as efficiently collected resulting in low estimates for counts of certain mold spores. Volumetric Spore Traps draw air into the sampler at a given rate. The particles in the air land on an adhesive coated microscope slide. After a period of sampling, usually one day, the sample is stained and the pollen grains and mold spores are identified and counted, and the concentrations in the air are calculated.

Regardless of the method used, the reported counts reflect the average count for the sampling period, not a real-time count determined at the time of the report, nor a forecast of future pollen counts. For example, a pollen count reported on Monday probably represents the average count for the 24-hour period ending at some time on Monday morning. Because various pollen and mold counts vary over the course of the day, the average count only provides an estimate of overall exposure. At certain times during the day, the concentration of various particles could be higher.

The American Academy of Allergy Asthma and Immunology (AAAAI) organized the Aeroallergen Monitoring Network, which has compiled pollen and mold counts for more than 30 years. The network was established to further the science of allergy, and to contribute to the information available to physicians for the diagnosis and treatment of allergic disease. The Network has reported pollen and mold spore counts to the public and the media since 1992 through the National Allergy Bureau (NAB). Member stations report pollen and mold counts to the NAB which releases reports to interested media outlets and to the public through the AAAAI web site. Results are reported as total tree pollen, grass pollen, weed pollen, and mold spore counts per cubic meter with comments about their relative amounts. This information allows allergy sufferers and their physicians to correlate symptoms and causing agents. However, this information also fails to provide a forecast of pollen counts for future times/dates.

Accurate forecasts of future counts would allow people to adjust activities on days with predicted high counts. Until reliable forecasts are available, people with symptoms will have to rely on trends in recent high pollen counts to take appropriate precautions regarding avoidance. Thus, in view of the foregoing, there is a need for a method of providing a forecasted pollen count that overcomes the limitations and drawbacks of the prior art. The present invention provides such a solution.

SUMMARY OF THE INVENTION

The present invention is directed to method and system for providing an improved pollen forecast for tree, grass, and ragweed pollen levels. The system provides a pollen forecast for geographic areas specified by a user. The forecast is based on observed and forecast weather conditions and observed pollen conditions. A growing degree day value is determined that is used to represent trends in pollen activity. From this information, a pollen forecast is presented on a "Low-Moderate-High-Very High" scale in order to quickly convey to the user the forecasted pollen count.

In accordance with an aspect of the invention, there is provided a method of providing a pollen forecast for a geographic region. The method includes obtaining a current pollen observation; obtaining a precipitation forecast; determining a growing degree day quantity; determining a first pollen forecast for a current day in accordance with the current pollen observation, the precipitation forecast, and the growing degree day factor; and determining a second pollen forecast for a next day in accordance with the first pollen forecast, the precipitation forecast, and the growing degree day factor.

In accordance with a feature of the invention, the method includes determining the growing degree day in accordance with the following relationship: Growing Degree Day=((High Temp+Low Temp)/2)−Base Temp. The Base Temp is dependent on a plant species, and the High Temp and the Low Temp are the high and low temperature, respectively, for a particular day. The method may include determining a pollen onset, a pollen peak, and a pollen offset. The pollen onset, the pollen peak, and the pollen offset are correlated to a cumulative growing degree day value to identify what function a plant is performing. From this, a trend of pollen functionality may be determined based on the pollen onset and the cumulative growing degree day and using the trend in determining the growing degree day quantity.

In accordance with another feature, the weather forecasts are used to adjust a cumulative growing degree day for each location, adjusting a forecast growing degree day for the first day, and adjusting the observed pollen level in accordance with a trend of pollen functionality. The method may also determine a number of hours of precipitation forecasted and an intensity of the precipitation. The precipitation amount may be divided into bins to allow for qualitative amounts of removing pollen from the atmosphere.

In accordance with another aspect of the invention, there is provided a method that includes determining a weather forecast for the day; obtaining a pollen observation; determining pollen trend data; and applying the weather forecast for the day, the pollen observation and the pollen trend data to determine the pollen forecast.

In accordance with yet another aspect of the invention, there is provided a system for providing a pollen forecast. The system includes a database that stores information about pollen and weather conditions registered to geographic locations, and a processor programmed to execute instructions for performing the steps of determining pollen trend data; and applying the weather conditions, the pollen conditions and the pollen trend data to determine the pollen forecast.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Figure 1:
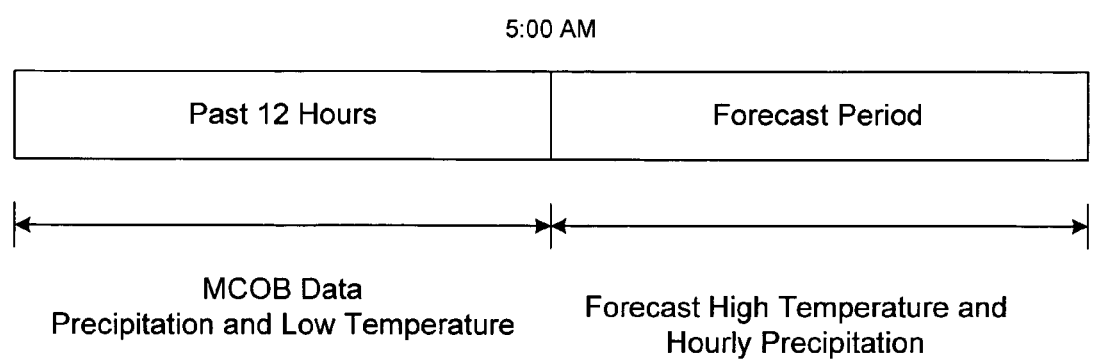
FIG. 1 illustrates a 5:00 AM "Today" forecast that is valid for a calendar day.
Figure 2:
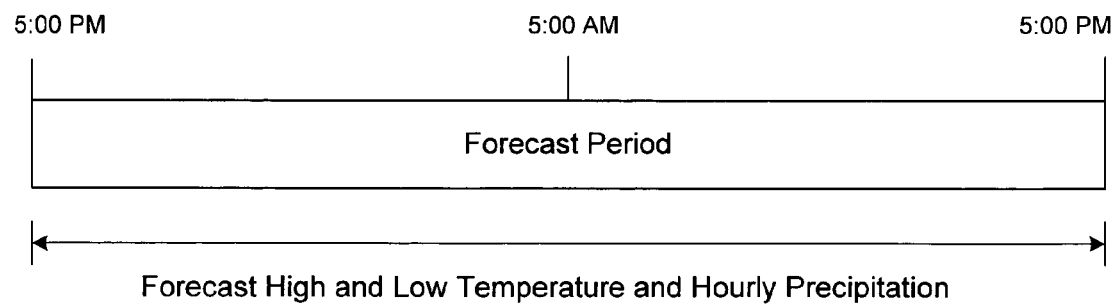
FIG. 2 illustrates a 5:00 PM "Today" forecast that is valid for a next calendar day.

As an overview, the present invention is directed to a system for providing an improved pollen forecast that preferably includes tree, grass, and ragweed pollen levels. It is preferred that the system provide a searchable, two-day forecast for geographic areas of interest. The forecast is presented on a "Low-Moderate-High-Very High" scale (with "Not Available" or similar when the forecast is not applicable) in order to quickly convey to the user the forecasted pollen count. For mapping purposes, the forecasts are provided on whole number scales, for example, a 0–4 scale. The forecast is preferably updated twice a day at 5:00 AM and 5:00 PM, however additional or fewer updates at different times may be provided. As shown in FIG. 1, a 5:00 AM "Today" forecast will be valid for the same calendar day. As shown in FIG. 2, at 5:00 PM, the "Today" forecast will be valid for the next calendar day. This implies that the day rollover is to occur at 5:00 PM.

It is preferable to base pollen forecasts on three factors. The factors include: current pollen observations (such as those provided by Morrie Trumble & Associates), precipitation forecasts, and Growing Degree Days (GDD). The current pollen observations are a predominate contributor to the forecast. Precipitation is the leading sink in the pollen that is currently observed in the atmosphere. For this reason, the precipitation forecast is a sink in the forecast. From the AAAAI data, the present invention generates "profiles," which are estimated bimonthly summaries of the collected data. Three specific dates are determined from the AAAAI data: pollen onset, pollen peak, and pollen offset. The dates are then filtered by pollen type if there were multiple pollen types at one location. For example, if oak had an onset date of April 7 and cedar had an onset date of April 14, the tree onset date chosen was April 7. This was the data that was extracted from the books, and used in the forecast. The onset, peak, and offset dates are tied to cumulative Growing Degree Days, which are the sum of Growing Degree Days over a season, which in turn can be associated with when and duration of a pollen season.

The formula for Growing Degree Day is as follows:

$$\text{Growing Degree Day} = ((\text{High Temp} + \text{Low Temp})/2) - \text{Base Temp}$$

The base temperature (Base Temp) used can vary by plant species, latitude, soil type, etc. However for the granularity of the forecast, it is preferred to use a Base Temp of 32° F. The theory of GDD is that if the sum of the high temperature and low temperature exceeds the base temperature at which a plant biologically active, the plant will become active. Additionally, at a determined cumulative GDD, a plant will perform a certain biological functions, such as those related to pollination. It can be inferred that when a certain cumulative GDD is reached for a plant species at specific location pollination begins, peaks, and ends. This explains why plants at pollinate seasonally per location.

Figure 3:
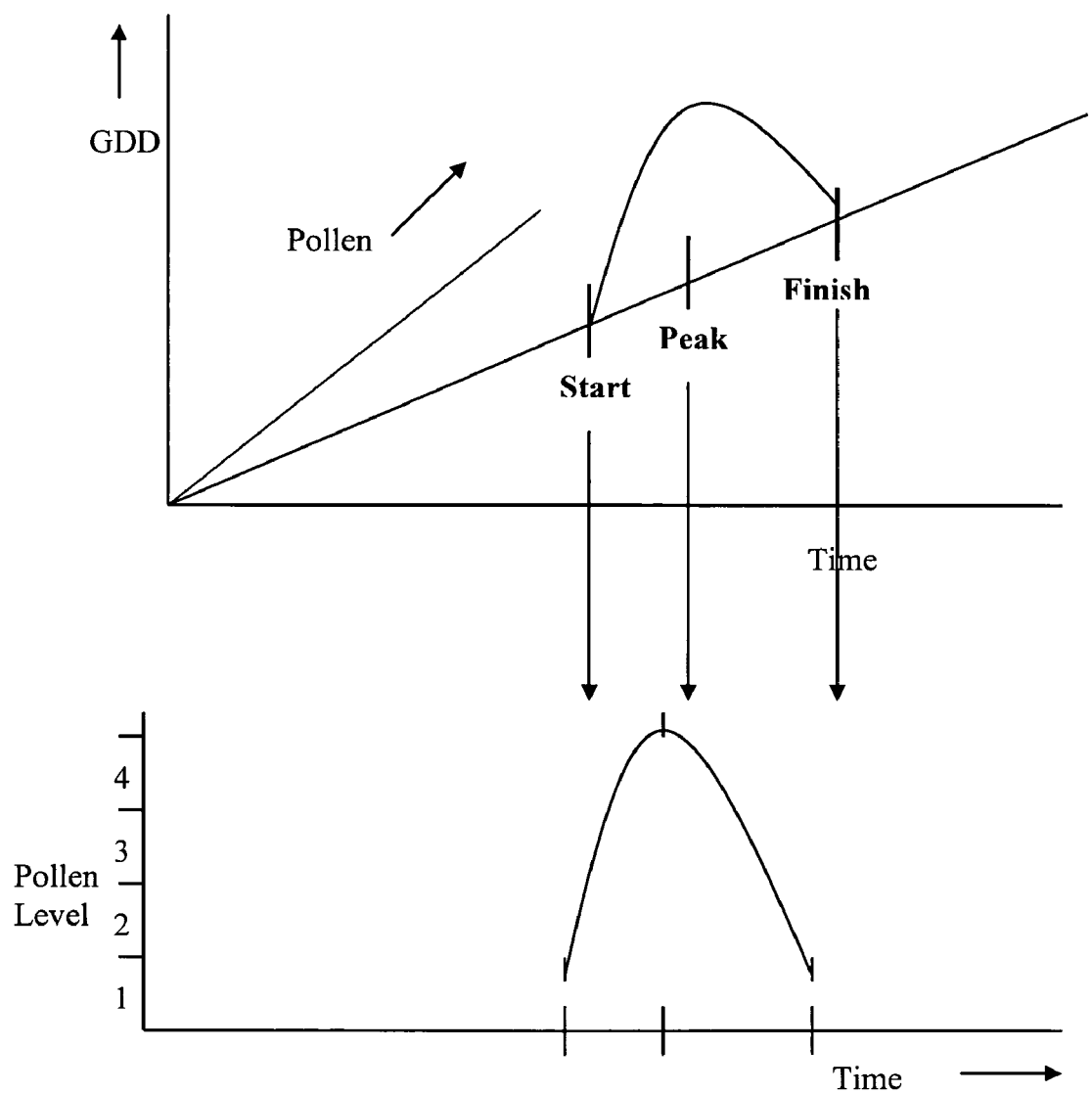
FIG. 3 is a graph of a trend of pollen functionality and a graph of pollen behavior over a season.

Correlating the specific dates of plant functions with the cumulative GDD can specifically identify what function a plant is performing. According to the present invention, based on the onset of pollen and the corresponding cumulative GDD, the onset of a specific pollen type at a specific location is determined on an annual basis. This method accounts for colder or warmer seasons and when the key events in plant functions occur. From this method a "trend" of pollen functionality may be developed, as shown in upper graph of FIG. 3. Assuming pollination behaves like a "blackbody," the curve of pollen density in the atmosphere over time is similar to the Planck Function, however, this assumption could not be reproduced. Instead, there are two distinct curves observed when examining the pollen distribution in the atmosphere over a season. One curve representing the beginning of the season and one curve representing the eding of the season. The point that each of the curves is adjoined is at the peak of the season. From this, two distinct curves represent the pollen behavior over a season. This held true for all pollen types and is represented by the lower graph of FIG. 3.

Figure 4:
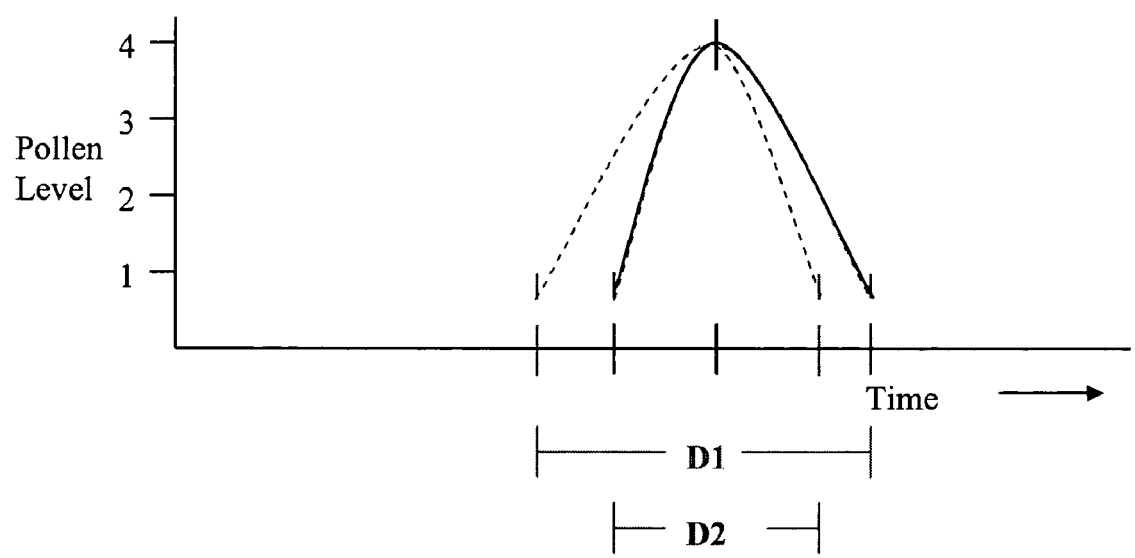
FIG. 4 illustrates two quadratic equations used to simulate pollen before and after a peak.

Expanding on the above, it can be assumed that pollen behavior and distribution leading up to the peak differs from the behavior and distribution of pollen after peak. The method of differentiating these two distinct curves is shown in FIG. 4. In this chart, the method of using two distinct quadratic equations before and after peak allows the pollen behavior curve to have simulated different curves. One quadratic equation is used to simulate trend before peak and another after peak. Using this method, a simulated trend of pseudo-climatology can be derived each season per location per the cumulated GDD. This method also allows for the onset, peak, and offset dates to be tied to the root of plant behavior, temperature, not calendar day.

Before the pseudo-climatology trend is taken into account in the forecast, the pollen observation data is utilized. The observations used for the data are generally taken in the morning and received at 5:00 PM. Because forecasts of pollen are scheduled to be made at times in the day other than the provided observation time, the observed high and low temperatures used in the GDD induced pollen trend, and precipitation data is utilized to adjust the pollen observation for initialization of forecasts not occurring at the observation time. The weather inputs are the precipitation and the temperature. These are both observed and forecasted. The observed weather is obtained from MCOB data (Multi-Cast Observations, which is an observation software client available from WSI Corporation, Andover, Mass.), while the weather forecasts are derived from the daily forecast and the hourly sensible weather.

MCOB data is imported for several reasons: to adjust the true cumulative GDD for each location, adjust the forecast GDD for the day (at the 5:00 AM forecasting run using the MCOB low temperature and the forecast high as inputs, as described below), and adjust the observed pollen level to take account of overnight precipitation. In order to find a trend in the season, a record of cumulative GDD is needed. For this reason, there is a recording of the daily high and low temperature for each location each day. This value is used to compute the actual cumulative GDD and the forecasted GDD value for each location. Each day, the high and low temperatures are recorded and added to the cumulative GDD data. This aids in determining where in the season the plant cycle should be based on observed data.

To achieve this, MCOB data is extracted. At the 5:00 AM forecast run, the low temperature can be approximated by the lowest hourly temperature from the period of 5:00 PM the previous day to current hour. This input plus the forecasted high temperature would create the forecasted GDD for Day 1. The forecasted GDD value would only be updated at this time. Additionally, at the 5:00 AM forecast run, the pollen data is 12 hours old, and under the assumption that precipitation is a sink in the amount of pollen, an adjustment in the observation must be made to account for precipitation if applicable. This data is obtained from MCOB precipitation observations from 5:00 PM to the current hour.

The forecasted weather is broken into three components: daily high temperature, daily low temperature, and hours of precipitation. As discussed above, the forecast high and low temperature is used to show the trend of the cumulative GDD over time. At the 5:00 AM run, assuming that the low temperature can be best approximated as the lowest temperature from the previous 12 hours, the forecasted high temperature is needed to arrive at the "Today" GDD value for the day. The low temperature of the next forecast period and the high temperature from the following period would make up the "Tomorrow" GDD value. At the 5:00 PM forecast, the "Today" GDD value from 5:00 AM will be added to the true cumulative GDD to determine the "current" cumulative GDD. The forecast low temperature for the current forecast period and the high temperature from the following period will make up the "Today" forecast GDD value.

Hours of precipitation forecasted act as the sink in the pollen levels as noted above. In order to find hours of forecast precipitation, the hourly sensible weather codes from TOPPS (TWC Operation Post Processing System, which is an ingestion and distribution system of forecasts provided by The Weather Channel Interactive, Inc., Atlanta, Ga.) is used. For the 5:00 AM "Today" forecast, the next 12 hours of icon codes are used, while the MCOB precipitation observations fill in the previous 12 hours to create the "Today" forecast. At the 5:00 PM "Today" forecast, the next 24 hours of sensible weather codes are used. The precipitation is further broken down into three bins to allow for qualitative amounts of "washing" pollen out of the atmosphere. For example, if rain is forecasted for 6 hours, it is determined to have more value than if sprinkles were forecasted over 6 hours. The bins are ranked from one being the lowest ability to "wash" pollen out of the atmosphere to three with the greatest ability. Each bin was determined to have a maximum contribution as well.

The equations for each bin are as follows:

Contribution=-(Hours of Bin3)*1/6 where Max Contribution=-1.5+Contribution=-(Hours of Bin2) *1/9 where Max Contribution=-1.0+Contribution=-(Hours of Bin1)*1/15 where Max Contribution=-1.0

Sum Of all Precipitation Contributions where Max Sum Contribution=-2.0

The qualitative sink of the precipitation is an area that is monitored over time. Adjustments in the multiplicative factor and Max Contribution may be made over time.

Utilizing these components, the forecast for pollen may be expressed as an equation as follows:

$$P_{f1}=(1-w_{adj1})*P_{ob}+(w_{adj1})P_{GDD1}+W_1$$

$$P_{f2}=(1-w_{adj2})*P_{f1}+(w_{adj2})P_{GDD2}+W_2$$

Where,
$P_{f1}$=Pollen Forecast Day 1
$P_{ob}$=Pollen Observation from Morrie Trumble
$W_{adj1}$=GDD Derived trend percentage contribution Day 1
$P_{GDD1}$=GDD Derived Pollen Level Day 1
$W_1$=Weather (Precipitation Sink) Contribution Day 1 (0.20 is preferable)
$P_{f2}$=Pollen Forecast Day 2
$W_{adj2}$=GDD Derived trend percentage contribution Day 2
$P_{GDD2}$=GDD Derived Pollen Level Day 2
$W_2$=Weather (Precipitation Sink) Contribution Day 2 (0.40 is preferable)

The GDD Derived trend percentage for day 1 is preferably 0.20, or twenty percent. For day 2, the trend percentage is preferably 0.40, or forty percent. The twenty percent for day 1 allows a small portion of the forecast to be influenced by the derived trend of pollen climatology. Increased percentage of influence on day 2 shows that there is less certainty in the observation and that the derived trend has more influence. However, both percentage values chosen are preferably below fifty percent, as there is more value in the pollen observation than the derived trend. Along with the precipitation bin methodology, the percentage and contribution to the forecast of GDD may be changed in accordance with needs.

One of the shortcomings with relying on the observations for the pollen forecast is that allergists are relied upon for the observations. From experience, allergists are not sampling the pollen data every day of the year. For instance, allergists often do not sample on the weekend, and they may be out of the office for extended periods of time. For this reason, if an observation is not provided on a weekday, the derived GDD pollen level is used instead of the observation. This is based on the assumption that generally, when an observation is not submitted to the data feed, the allergist is away for an extended period of time.

Because of this, on the weekends, the "Today" forecast for Friday at 5:00 PM is used for the pollen observation for the Saturday forecast run. On Sunday, the Saturday "Today" forecast is the pollen observation for the forecast runs. This continues on until Monday when the new pollen observation is introduced. The reasoning behind this methodology allows value to be placed in the observation on Saturday while adjusting the pollen observation to the GDD trend. As the weekend progresses, it was assumed that the pollen observation would trend away from the Friday observation toward the GDD derived pollen level.

Figure 5:
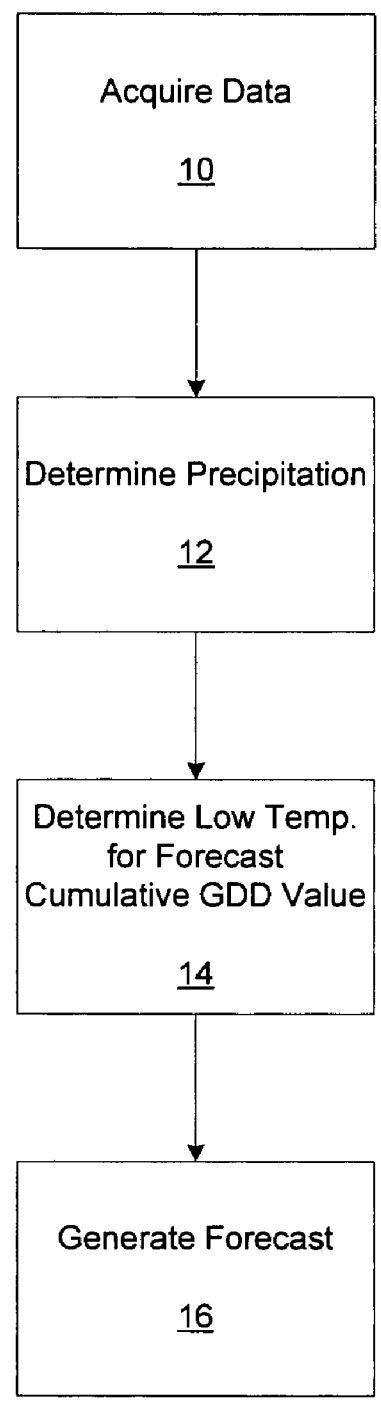
FIG. 5 illustrates a flow chart of the process to generate a forecast run.

In accordance with the present invention, the following describes the forecasting steps for the 5:00 AM Forecast, 5:00 PM Forecast and update of the GDD. Referring now to FIG. 5, for the 5:00 am forecast run, at step 10 the data need for the forecast is acquired, as follows:

1) MCOB past 12 hours of precipitation
2) MCOB lowest hourly temperature over the past 12 hours
3) Actual GDD data
4) Forecast Day 1 High, Day 2 Low, Day 2 High
5) 12 hours from 5:00 AM to 5:00 PM of hourly sensible weather phrases
6) GDD Equation data
7) Pollen Observation
8) Sensible Weather vs. Bin Contribution Table Methodology At step 12, the past precipitation and forecast precipitation is determined as follows:

1) Sum up the total hours of precipitation (precipitation>0.01").
2) Number of hours follows that of above described methodology for Bin 3 (heaviest bin).
3) Count each hour of sensible weather for the rest of the forecast period (next 12 hours).
4) Put the sensible weather into bins using the above methodology.
5) Sum the bins and the past precipitation for the $W_1$ term.
6) Repeat steps 3–6 for the next forecast period using forecast precipitation, for the $W_2$ term.

At step 14, the MCOB low temperature for the forecast cumulative GDD value is determined as follows:

1) Find lowest temperature in the past 12 hours from MCOB data.
2) Using the low temperature add the forecast high temperature subtract 32 and divide by two.
3) Add this value to the actual GDD data value.
4) Look up the GDD equation for the location. Determine what equation to use.
5) If out of bounds and there is no pollen observation, report 0, "out of season". Next location.
6) Use the corresponding quadratic equation using the forecast GDD: $P_{GDD1}=Ax^2+Bx+C$
7) Using the forecasted GDD for day 1, repeat the steps 2–6 using the forecasted low temperature and the forecasted high temperature for the next period.

At step 16, the forecast is created as follows:

1) Plug the values into the equation for the Day 1 forecast. If the pollen observation is not present, the cumulative GDD pollen level value will be used in place.
2) Repeat step one replacing the needed variables.

Populate Forecast GDD data

1) Save the Day Forecast GDD data for Day 1 to be used at the 5:00 PM forecast run.

For the 5:00 PM forecast run, the process of FIG. 5 is also followed. At step 10 the data needed to create the forecast is acquired as follows:

1) Forecast GDD data
2) Forecast Day 1 High, Day 2 Low, Day 2 High
3) 12 hours from 5:00 AM to 5:00 PM of hourly sensible weather phrases
4) GDD Equation data
5) Pollen Observation
6) Sensible Weather vs. Bin Contribution Table At step 12, the forecast precipitation is determined as follows:

1) Sum up the total hours of precipitation (precipitation>0.01").
2) Number of hours follows that of above described methodology for Bin 3 (heaviest bin).
3) Count each hour of sensible weather for the rest of the forecast period (next 12 hours).
4) Put the sensible weather into bins using the above methodology.
5) Sum the bins and the past precipitation for the $W_1$ term.
6) Repeat steps 3–6 for the next forecast period using forecast precipitation, for the $W_2$ term.

At step 14, the MCOB low temperature for the forecast cumulative GDD value is determined as follows:

8) Find lowest temperature in the past 12 hours from MCOB data.
9) Using the low temperature add the forecast high temperature subtract 32 and divide by two.
10) Add this value to the actual GDD data value.
11) Look up the GDD equation for the location. Determine what equation to use.
12) If out of bounds and there is no pollen observation, report 0, "out of season". Next location.
13) Use the corresponding quadratic equation using the forecast GDD: $P_{GDD1}=Ax^2+Bx+C$
14) Using the forecasted GDD for day 1, repeat the steps 2–6 using the forecasted low temperature and the forecasted high temperature for the next period.

At step 16, the forecast is created as follows:

1) Plug the values into the equation for the Day 1 forecast.
a. If the pollen observation is not present, the cumulative GDD pollen level value will be used in place.
2) Repeat step one replacing the needed variables.

Populate Weekend Observation data

1) If the day is Friday replace the pollen observation for the next forecast with the forecast for "Today" (Sunday).

Figure 6:
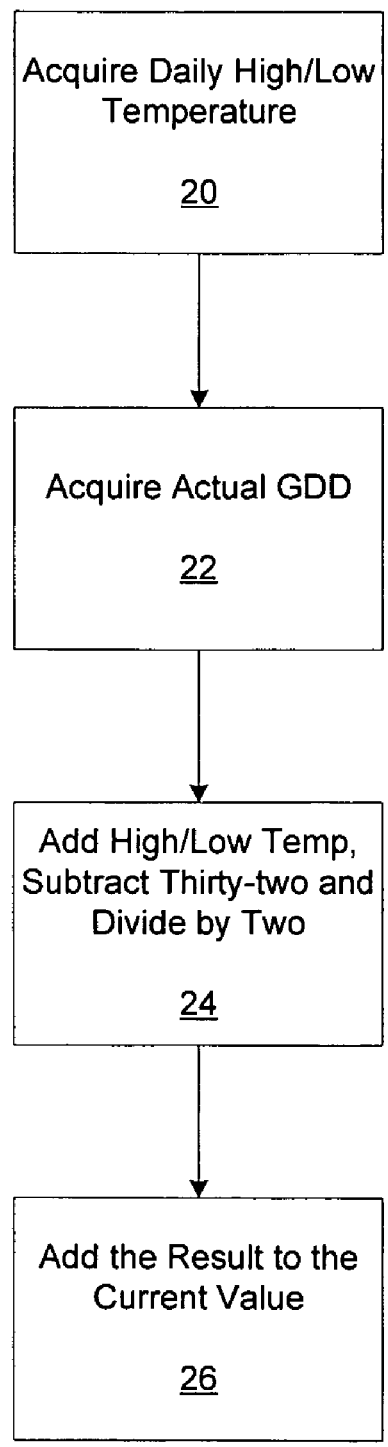
FIG. 6 illustrates a flow chart of the process to perform for a daily update of a Growing Degree Day (GDD) value.

Referring now to FIG. 6, there is illustrated the steps to perform for the daily update of the GDD. At step 20, the daily high and low temperature are acquired from MCOB. At step 22, the actual GDD value data is acquired. At step 24, the high temperature and the low temperature are added together, then 32 is subtracted therefrom and the result divided by two. At step 26, the result from step 24 is added to the current value to get the true cumulative GDD value for the location.

Figure 7:
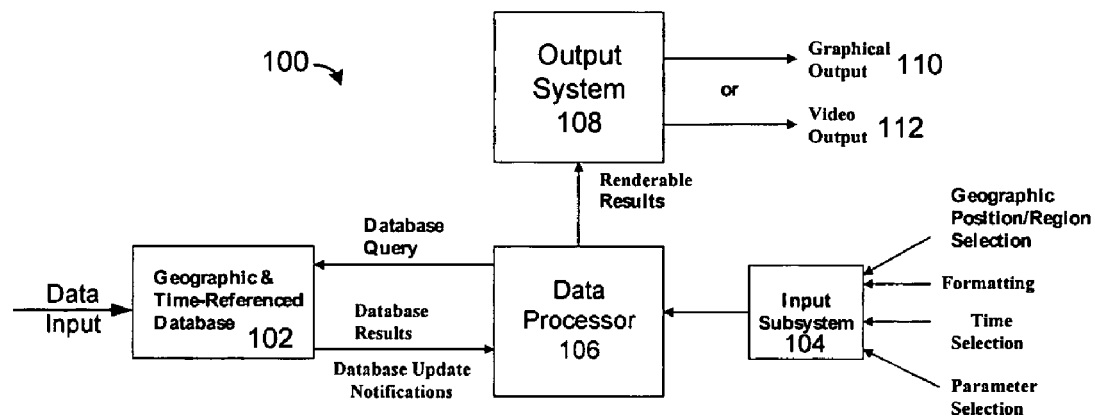
FIG. 7 illustrates an exemplary a system that may be used to implement the present invention.

Referring now to FIG. 7, there is illustrated an overview of a system 100 that may be used to implement the present invention. A database 102 may receive and store data that is geographically registered. The data may also include temporal characteristics, such that it is dynamic over time. The data provided to the database 102 may come from several sources.

An input subsystem 104 is provided to receive input from a user, such as a geographic position/region selection, formatting inputs, a time selection, and a parameter selection (e.g., weather, current observations, etc.). The user input may come from a personal computer running the appropriate software to generate inputs that may be received and processed by the system 100 via a data processor 106. For example, this input may come from the user via a mouse, a typed command at a keyboard, from an interactive device such as a computer touch screen, a visual tracking system, etc.

The user inputs may include, but are not limited to, a selection of one or more parameters that are to be extracted from the underlying database 102. The inputs may specify to the processor 106 a specific time or a time range for which the database is to be queried, or a geographic position or region for which the data is to be queried in accordance with the user input. Formatting may be specified that indicates how information is to be displayed. The formatting may include a presentation format (e.g., textual versus iconic), and graphical attributes such as font or line width. Given these inputs, the data interaction processor 106 performs a query of the database 102, formats the information based on the selected format specification, and presents the results to an output system 108 for presentation.

The output system 108 for this system 100 can be any computer graphics system capable of generating graphical representations of geographic information such that that representation can be displayed on broadcast television, cable or other transmission media. The output system 108 is graphical in nature and presents, e.g., a map of a particular geographic area and turns coded information extracted from the database 102 via the data interaction processor 106 into a graphical display. The output system 108 includes both video and graphical outputs 110 and 112, which may be used for broadcast television, or to provide a datastream communicated over the Internet or other wide area network for use by visitors to websites (e.g., personal computers running Web Browsers and/or Flash players, etc.).

The system 100 may automatically generate a geographical map display showing a subset of the real-time information. Prior to airtime, the user has the ability to tailor the graphical representation by prioritizing and/or filtering the types of information to be displayed. The user may select the graphical representation and/or attributes for the information, region of coverage for the map display, and define graphical attributes of the GIS database such as line widths, colors and iconic representations for point features. The same features may be provided to visitors to a website.

While the present invention has been described in connection with the preferred embodiments of the various Figs., it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of providing a pollen forecast for a geographic region, comprising:
   obtaining a current pollen observation;
   obtaining a precipitation forecast;
   determining a growing degree day quantity;
   determining a first pollen forecast for a current day in accordance with said current pollen observation, said precipitation forecast, and said growing degree day factor; and
   determining a second pollen forecast for a next day in accordance with said first pollen forecast, said precipitation forecast, and said growing degree day factor; and
   conveying to a user one or more of said first pollen forecast and said second pollen forecast for a geographic region.

2. The method of claim 1, further comprising determining said growing degree day in accordance with the following relationship:

Growing Degree Day=((High Temp+Low Temp)/2)−Base Temp wherein said Base Temp is dependent on a plant species, and said High Temp and said Low Temp are the high and low temperature, respectively, for a particular day.

3. The method of claim 1, further comprising determining a pollen onset, a pollen peak, and a pollen offset, wherein said pollen onset, said pollen peak, and said pollen offset are correlated to a cumulative growing degree day value to identify a function that a plant is performing.

4. The method of claim 3, further comprising determining a trend of pollen functionality based on said pollen onset and said cumulative growing degree day and using said trend in determining said growing degree day quantity.

5. The method of claim 4, further comprising accounting for colder or warmer seasons and determining a pollen behavior distribution before and after said pollen peak.

6. The method of claim 1, wherein an observed high temperature and an observed low temperature from weather forecasts are used in determining said growing degree day quantity.

7. The method of claim 6, wherein said weather forecasts are used to adjust a cumulative growing degree day for each location, adjust a forecast growing degree day for said first day, and adjust said observed pollen level in accordance with a trend of pollen functionality.

8. The method of claim 7, further comprising determining a number of hours of precipitation forecasted and an intensity of said precipitation.

9. The method of claim 8, further comprising dividing said precipitation into bins to allow for qualitative amounts of removing pollen from the atmosphere.

10. The method of claim 9, further comprising defining a contribution of said precipitation in accordance with the following relationships:

Contribution1=−(Hours of Bin3)*1/6, wherein a maximum contribution=−1.5

Contribution2=−(Hours of Bin2)*1/9, wherein a maximum contribution =−1.0

Contribution3=−(Hours of Bin1)*1/15, wherein a maximum contribution =−1.0 and wherein a maximum sum of the Contribution1, Contribution2 and Contribution3 is −2.0.

11. The method of claim 10, further comprising determining said pollen forecast according to the following relationships:

$$P_{f1}=(1-w_{adj1})*P_{ob}+(w_{adj1})P_{GDD1}+W_1$$

$$P_{f2}=(1-w_{adj2})*P_{f1}+(w_{adj2})P_{GDD2}+W_2$$

wherein
    $P_{f1}$=Pollen Forecast for said first day $P_{ob}$=Pollen Observation
$W_{adj1}$=growing degree day derived trend percentage contribution for said first day
$P_{GDD1}$ growing degree day derived Pollen Level for said first day
$W_1$=Weather Contribution said first day
$P_{f2}$=Pollen Forecast for said second day
$W_{adj2}$=growing degree day derived trend percentage contribution for said second day
$P_{GDD2}$=growing degree day derived pollen level for said second day
$W_2$=Weather Contribution for said second day.

12. A method of determining a pollen forecast for a day, comprising:
determining a weather forecast for said day;
obtaining a pollen observation;
determining pollen trend data;
applying said weather forecast for said day, said pollen observation and said pollen trend data to determine said pollen forecast; and
conveying to a user said pollen forecast for said day.

13. The method of claim 12, further comprising:
determining a growing degree day value in accordance with the following relationship:

Growing Degree Day=((High Temp+Low Temp)/2)−Base Temp;

determining a pollen onset, a pollen peak, and a pollen offset; and
correlating said pollen onset, said pollen peak, and said pollen offset to a cumulative growing degree day,
wherein said Base Temp is dependent on a plant species, and said High Temp and said Low Temp are the high and low temperature, respectively, for a particular day.

14. The method of claim 13, wherein said cumulative growing degree day accounts for seasonal variations in pollen behavior before and after said pollen peak.

15. The method of claim 13, wherein an observed high temperature and an observed low temperature from said weather forecast are used in determining said growing degree day quantity.

16. The method of claim 12, wherein said weather forecast is used to adjust a cumulative growing degree day for each location, adjust a forecast growing degree day for said day, and adjust said observed pollen level in accordance with said pollen trend data.

17. The method of claim 16, further comprising determining a number of hours of precipitation forecasted and an intensity of said precipitation.

18. The method of claim 17, further comprising dividing said precipitation into quantized amounts related to removal of said pollen from the atmosphere by said precipitation.

19. The method of claim 17, further comprising determining said pollen forecast according to the following relationship:

$P_{f1}=(1-w_{adj1})*P_{ob}+(w_{adj1})P_{GDD1}+W_1$ wherein
$P_{f1}$=Pollen Forecast for said day
$P_{ob}$=Pollen Observation
$W_{adj1}$=growing degree day derived trend percentage contribution for said day
$P_{GDD1}$=growing degree day derived Pollen Level for said day
$W_1$=Weather Contribution said day.

20. A system for providing a pollen forecast, comprising:
a database that stores information about pollen and weather conditions related to geographic locations; and
a processor programmed to execute instructions for performing the following:
determining pollen trend data and applying said pollen trend data to a day; and
applying said weather conditions, said pollen conditions and said pollen trend data to determine said pollen forecast; and
and output system that generates an indication representative of said pollen forecast.

21. The system of claim 20, wherein said processor further determines determining a growing degree day value in accordance with the following relationship:

Growing Degree Day=((High Temp+Low Temp)/2)−Base Temp;

determining a pollen onset, a pollen peak, and a pollen offset; and
correlating said pollen onset, said pollen peak, and said pollen offset to a cumulative growing degree day,
wherein said Base Temp is dependent on a plant species, and said High Temp and said Low Temp are the high and low temperature, respectively, for a particular day.

22. The system of claim 20, wherein said weather conditions are used to adjust a cumulative growing degree day for each location, adjust a forecast growing degree day, and adjust said pollen conditions in accordance with said pollen trend data.

23. The system of claim 22, wherein said processor determines a number of hours of precipitation forecasted and an intensity of said precipitation.

24. The system of claim 22, wherein said processor determines said pollen forecast according to the following relationship:

$P_{f1}=(1-w_{adj1})*P_{ob}+(w_{adj1})P_{GDD1}+W_1$ wherein
$P_{f1}$=Pollen Forecast for said day
$P_{ob}$=Pollen Observation
$W_{adj1}$=growing degree day derived trend percentage contribution for said day
$P_{GDD1}$=growing degree day derived Pollen Level for said day
$W_1$=Weather Contribution said day.

* * * * *

UNITED STATES PATENT AND TRADEMARK OFFICE
CERTIFICATE OF CORRECTION

PATENT NO. : 7,184,891 B1 Page 1 of 1
APPLICATION NO. : 10/868106
DATED : February 27, 2007
INVENTOR(S) : Christopher R. Kuleszynski et al.

It is certified that error appears in the above-identified patent and that said Letters Patent is hereby corrected as shown below:

Column 10,
Line 4, delete "and".

Column 12,
Line 15, delete "and".
Line 19, delete "and" and insert -- an --.

Signed and Sealed this

Sixth Day of November, 2007

JON W. DUDAS
*Director of the United States Patent and Trademark Office*